US012563046B2

(12) United States Patent
Ezrielev et al.

(10) Patent No.: US 12,563,046 B2
(45) Date of Patent: *Feb. 24, 2026

(54) VOTING AS LAST RESORT ACCESS RECOVERY FOR COMMON IDENTITY AND ACCESS MANAGEMENT

(71) Applicant: Dell Products L.P., Round Rock, TX (US)

(72) Inventors: Ofir Ezrielev, Be'er Sheba (IL); Lee Serfaty, Be'er Sheba (IL); Yehiel Zohar, Sderot (IL)

(73) Assignee: Dell Products L.P., Round Rock, TX (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/057,287

(22) Filed: Nov. 21, 2022

(65) Prior Publication Data

US 2024/0171589 A1      May 23, 2024

(51) Int. Cl.
*H04L 9/40*           (2022.01)

(52) U.S. Cl.
CPC ........ H04L 63/108 (2013.01); H04L 63/0823 (2013.01); H04L 63/102 (2013.01)

(58) Field of Classification Search
CPC .. H04L 63/108; H04L 63/0823; H04L 63/102
See application file for complete search history.

(56) References Cited

U.S. PATENT DOCUMENTS

| | | | |
|---|---|---|---|
| 6,748,084 B1 | 6/2004 | Gau et al. | |
| 8,181,016 B1 | 5/2012 | Borgia et al. | |
| 9,652,617 B1 | 5/2017 | Evans et al. | |
| 10,412,097 B1 * | 9/2019 | Banshats | H04L 63/083 |
| 10,601,816 B1 * | 3/2020 | Stickle | H04W 4/08 |
| 10,903,991 B1 | 1/2021 | Craige et al. | |
| 11,057,210 B1 | 7/2021 | Sierra et al. | |
| 11,722,491 B1 | 8/2023 | Al-Rashid et al. | |
| 11,914,696 B1 | 2/2024 | Saxe et al. | |
| 12,154,047 B1 | 11/2024 | Govindan et al. | |
| 12,299,173 B2 | 5/2025 | O'Neil et al. | |
| 2002/0184493 A1 | 12/2002 | Rees | |

(Continued)

FOREIGN PATENT DOCUMENTS

WO      2016/205886 A1    12/2016

OTHER PUBLICATIONS

Gunther Schiefer et al., "Security in a Distributed Key Management Approach," 2017, pp. 816-821. (Year: 2017).

(Continued)

*Primary Examiner* — Linglan Edwards
*Assistant Examiner* — Jacob Benedict Knackstedt
(74) *Attorney, Agent, or Firm* — Workman Nydegger

(57)           ABSTRACT

Reinstating access to a system of an admin whose certificate is invalid or expired is disclosed. When the admin's certificate is expired, the admin may send a request for reinstatement to tenant admins. One of the tenant admins, if satisfied as to the admin's identity, can invoke a voting operation that allows the tenant admins to vote on whether to reinstate the admin. If the vote is successful, one of the tenant admins is given temporary privileges or permissions to install the admin's new certificate, after which the admin is reinstated and has access to the system.

16 Claims, 3 Drawing Sheets

(56) References Cited

U.S. PATENT DOCUMENTS

| | | |
|---|---|---|
| 2003/0159032 A1 | 8/2003 | Gerck |
| 2007/0223702 A1 | 9/2007 | Tengler et al. |
| 2009/0283597 A1 | 11/2009 | Charles et al. |
| 2011/0022883 A1 | 1/2011 | Hansen |
| 2012/0016723 A1 | 1/2012 | Valles et al. |
| 2014/0195546 A1 | 7/2014 | Ren |
| 2016/0140335 A1 | 5/2016 | Proulx et al. |
| 2016/0277411 A1 | 9/2016 | Dani et al. |
| 2016/0350874 A1* | 12/2016 | Santos .................. G06Q 10/10 |
| 2018/0032750 A1 | 2/2018 | Hammel |
| 2018/0241747 A1 | 8/2018 | Tanaka et al. |
| 2019/0305938 A1 | 10/2019 | Sandberg-Maitland et al. |
| 2020/0036707 A1 | 1/2020 | Callahan et al. |
| 2020/0242232 A1 | 7/2020 | Machani |
| 2020/0351083 A1 | 11/2020 | Bartolucci et al. |
| 2020/0382327 A1 | 12/2020 | Mokhasi et al. |
| 2020/0412542 A1 | 12/2020 | Bartolucci et al. |
| 2021/0006418 A1 | 1/2021 | Wei |
| 2021/0064759 A1 | 3/2021 | Lomonaco et al. |
| 2021/0081520 A1 | 3/2021 | Howarth et al. |
| 2021/0133359 A1* | 5/2021 | Liu .......................... G06F 21/64 |
| 2021/0182423 A1* | 6/2021 | Padmanabhan ....... H04L 9/3271 |
| 2021/0258298 A1 | 8/2021 | Pattar et al. |
| 2021/0289033 A1 | 9/2021 | Ahuja |
| 2022/0076253 A1 | 3/2022 | Chaum |
| 2022/0076518 A1 | 3/2022 | Byun |
| 2022/0182239 A1 | 6/2022 | Hassanzadeh et al. |
| 2022/0271933 A1 | 8/2022 | Chen et al. |
| 2022/0342980 A1* | 10/2022 | Myers ..................... G06F 21/46 |
| 2023/0401307 A1* | 12/2023 | Pop ........................... G06F 8/65 |
| 2024/0086550 A1 | 3/2024 | Tamir et al. |
| 2024/0154988 A1 | 5/2024 | Yates |
| 2024/0163305 A1* | 5/2024 | Fridman ............. H04L 63/1433 |
| 2024/0171602 A1* | 5/2024 | Ezrielev ............. H04L 63/1433 |
| 2024/0380585 A1 | 11/2024 | Arora et al. |

OTHER PUBLICATIONS

Mohammad Faraji et al., "Identity Access Management for Multitier Cloud Infrastructures," 2014, pp. 1-9 (Year: 2014).

* cited by examiner

VOTING AS LAST RESORT ACCESS RECOVERY FOR COMMON IDENTITY AND ACCESS MANAGEMENT

FIELD OF THE INVENTION

Embodiments of the present invention generally relate to identity and access control and management. More particularly, at least some embodiments of the invention relate to systems, hardware, software, computer-readable media, and methods for recovering access, including administrator access, to identify and access management systems.

BACKGROUND

Computing environments and system may include a mixture of on-premise systems and cloud or edge-based systems. As these systems operate, data in these systems may originate at various locations and may be transmitted from one location to another location. For example, an entity may move data from on-premise locations to cloud or edge locations and vice versa.

It is beneficial and important to protect the data in these systems and to protect or control access to the data. To protect and/or control access to data, an entity may employ various strategies such as a zero-trust strategy. In a zero-trust strategy, no user, device, or network traffic is trusted by default. This type of strategy helps eliminate or at least reduce various security vulnerabilities.

One aspect of these data protection strategies relates to user authentication and access control. A common way to protect data or control access is to use basic username/password authentication. This type of authentication, however, may not provide sufficient long-term security. Certificate based authentication and access control is viewed as more secure.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
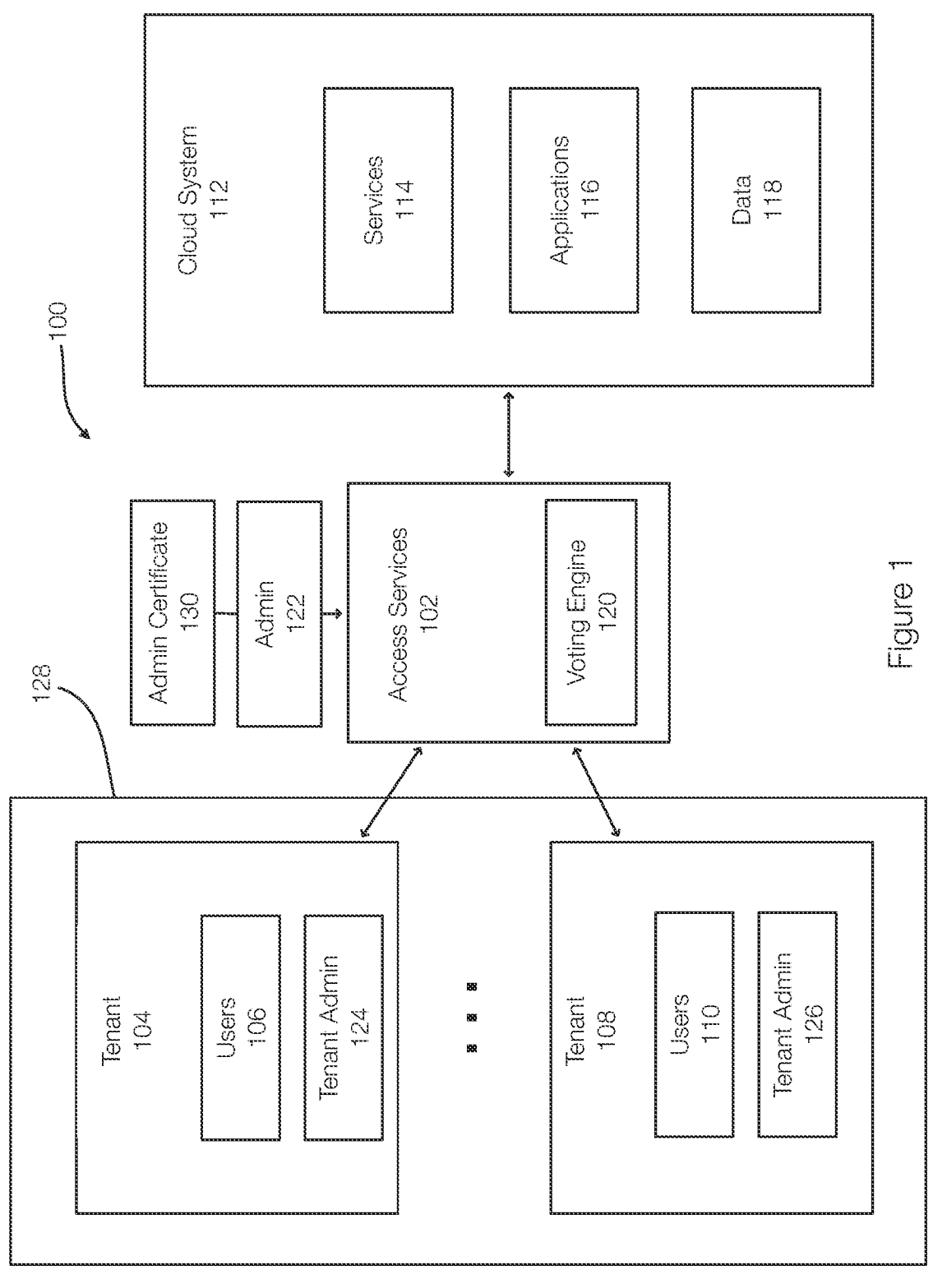
FIG. 1 discloses aspects of an environment that allows an administrator to be reinstated when their certificate is not valid or has expired.

Embodiments of the present invention generally relate to identity and access management. More particularly, at least some embodiments of the invention relate to systems, hardware, software, computer-readable media, and methods for restoring access to an administrator (admin) or other user that has lost access to a system.

More specifically, example embodiments of the invention relate to restoring access to identity and access management systems or services (referred to herein as access services). Common/Customer Identity and Access Management (CIAM) is an example of access services. Access services may control or manage client/user authentication, control data access, or the like. Access services ensure that customers can receive consistent configurations and capabilities across their application deployments in computing environments.

In a multi-tenant environment, access services may be managed by an admin. Each tenant is managed by a tenant administrator (a tenant admin). These admins may also be associated specific roles or permissions. An admin of the access services, for example, may have roles or permissions that allow the admin to perform operations or determine settings that impact multiple tenants. A tenant admin is limited to roles and permissions of a specific tenant.

By way of example, access services may perform basic authentication such as username/password or perform certificate-based authentication using mTLS (mutual Transport Layer Security) via a REST API (Representational State Transfer Application Programming Interface). Authentication performed using mTLS is generally more secure than basic authentication.

During an mTLS handshake, the certificate of the admin is validated against the trusted root CA (Certificate Authority). Invalid certificates (CA or server) may cause the mTLS handshake process to fail. Consequently, the requested access may fail or be denied. This may lead to a scenario where the admin does not have access to the access services. For example, an admin may attempt to access the access services and if the admin's certificate has expired, access will be denied or fail.

Embodiments of the invention relate to restoring access to the admin and, more specifically, to restoring access to the admin when the admin's certificate is invalid (e.g., expired). This may include installing a new certificate for the admin in the access services.

As previously stated, access services may authenticate clients using mTLS (mTLS handshake) via a REST API. This type of authentication ensures that the clients or users at each end of a network connection are who they claim to be by verifying that they both have the correct private key. The information included in their respective TLS (or other) certificates provides additional verification.

More specifically, when initiating access services (e.g., registering a new user) or when preparing to implement TLS, a public/private key is generated for a user. The private key is private to the user and should be kept secret. The public key may be included in the certificate that may be shared with others. Once the certificate is generated and signed by a certificate authority (CA), the certificate may be installed. Each user/device is typically associated with a role, permissions, and/or a certificate. These certificates are used to authenticate identity.

During the TLS handshake operation, a client encrypts data using the public key included in a server's certificate. The server will only be able to decrypt the data if the server has the corresponding private key. This process may be performed in both directions from client to server and from server to client. This allows the client to confirm that the server is who the server claims to be and allows the server to confirm that the client is who the client claims to be. This process requires the client and the server to use their respective private keys.

Trust in the certificate-based authentication is further improved using certificate authorities. The certificate authority is, in effect, a trusted third party. The certificate may include data that has been encrypted with the certificate authority's private key. Alternatively, the certificate has been signed by the certificate authority's private key and can be decrypted with the certificate authority's public key. This process may be further adapted to include root and intermediate certificate authorities. Processing a certificate that is signed by a trusted certificate authority provides further trust in the identity of the client and in the identity of the server.

A TLS certificate is a data file that includes, by way of example, information for verifying a server's identity or a device's identity and includes the public key, a statement of who issued the certificate (e.g., the CA), and the certificate's expiration date.

To make sure that an admin of access services can always access the access services, two options are conventionally available. The first option is to configure a client with an admin role with basic authentication (username/password) and the second option is to configure the client with the admin role with mTLS and ensure that its server certificate and certificate authority certificate are valid. However, the first option may not be sufficiently secure in the long term. The second option is more secure, but the admin may forget to renew or replace their certificates. If the admin's certificate expires or is invalid, the admin cannot access or manage the access services.

If the certificate of an admin (e.g., the admin of the access services) is expired or otherwise invalid, embodiments of the invention relate to restoring access for the admin and allowing a new certificate for the admin to be generated and/or installed.

FIG. 1 discloses aspects of a multi-tenant system including or associated with access services. The multi-tenant system 100 may include on-premise, edge, and/or cloud computing systems and machines. FIG. 1 illustrates tenants 128, represented by tenants 104 and 108, of a cloud system 112. The cloud system 112 may include or provide, by way of example only, services 114, applications 116, and data 118 to the tenants 128.

Each of the tenants 128 may use the at least some of the same services 114 and applications 116 (and may use the same instance of an application). The data 118, which may be stored in storage devices, may include the data of each of the tenants 128. However, the cloud system 112 is configured to keep data of the tenant 104 independent and separate from the data of the tenant 108. The data of any particular tenant is never available or accessible by any other tenant.

The tenant 104 may include users 106, which also represents devices that may access the cloud system 112 (e.g., client devices) and a tenant admin 124, which may also include or be associated with a tenant admin device. The tenant 108 may similarly include users 110 and a tenant admin 126.

The access services 102 is configured to control and manage identity and access of the tenants 128 to the cloud system 112. This access services 102 may include authentication, access control, customer registration, account management, consent, management, directory services, and the like or combination thereof.

The access services 102 is controlled or managed by an admin 122. The admin 122 (as well as the tenant admins 124 and 126 and the users 106 and 110) may also be registered with the access services 102 and may be associated with roles, privileges, or the like. Devices may be similarly registered. Thus, the admin 122 (as well as the tenant admins 126 and 126 and users 106 and 110) may be able to perform certain operations from certain devices. Alternatively, the admin 122 (or other tenant admin or user) may be able to perform their roles and permissions from any device as long as properly authenticated.

In this example, the users 106, 110, the tenant admins 124, 126, and the admin 122 are each associated with a certificate. The admin certificate 130 of the admin 122 is illustrated in FIG. 1. The certificates are typically used, including in a zero-trust strategy, whenever access is requested or when any operation is performed. In one example, the certificates may be used for authentication while roles or permissions may be used to control access after authentication.

In one example, the admin certificate 130 may expire. This prevents the admin 122 from accessing the access services 102 and thus may have an impact on the operation of the access services 102.

The access services 102 is configured with a voting engine 120 that may be invoked or used in order to reinstate the admin 122 and install a new certificate for the admin 122. Thus, the voting engine 120 is configured to reinstate the admin 122 in the event that the admin certificate 130 expires or is invalid for other reason.

If the admin 122 is unable to access the access services 102, the admin 122 may attempt to reinstate its certificate (e.g., have a new certificate installed). Initially, the admin 122 may contact one or more of the tenant admins 124 and 126 to notify them that the admin 122 is locked out. The admin 122 may send a new valid certificate to those clients (the tenant admins 124 and 126) at the same time or at another time during the reinstatement operation. The request from the admin 122 should inform the tenant admins 124 and 126 of the admin's identity.

One of the tenant admins, such as the tenant admin 124, may invoke the voting engine 120 using, for example, a REST API. The request may include characteristics of the admin 122. For example, the request may include information indicating how the tenant admin 124 verified the identity of the admin 122. For example, the tenant admin 124 may indicate that the admin 122 provided a secret word, sent an email, a text, or the like. The other tenant admins are notified that they can vote on whether they recognize the admin being recommended for reinstatement that was included or identified in the request. The tenant admins 124 and 126 may vote on reinstating the admin and if a threshold consensus is reached, the admin 122 may be restored. The consensus may be a percentage of possible or eligible votes. In one example, the threshold is 100%, but the threshold may be less than 100%.

If the voting process is successful, the initiating tenant admin (tenant admin 124 in this example) may be able to add the new certificate of the admin 122, which was previously received from the admin 122, to the access services 102 such that the admin 122 regains access to the access services 122.

The voting engine 120, upon receiving a request from the tenant admin 124 and prior to allowing voting, may ensure that no admin of the access services 102 has basic authentication options enabled and may confirm that no admin user has mTLS certificate-based options available. The tenant admins 124 and 126 may vote by accessing a certain URL, selecting "yes" or "no" on a webpage presented by the voting engine 120, or in other manner. The voting may be achieved using a digital questionnaire or in another manner.

Figure 2:
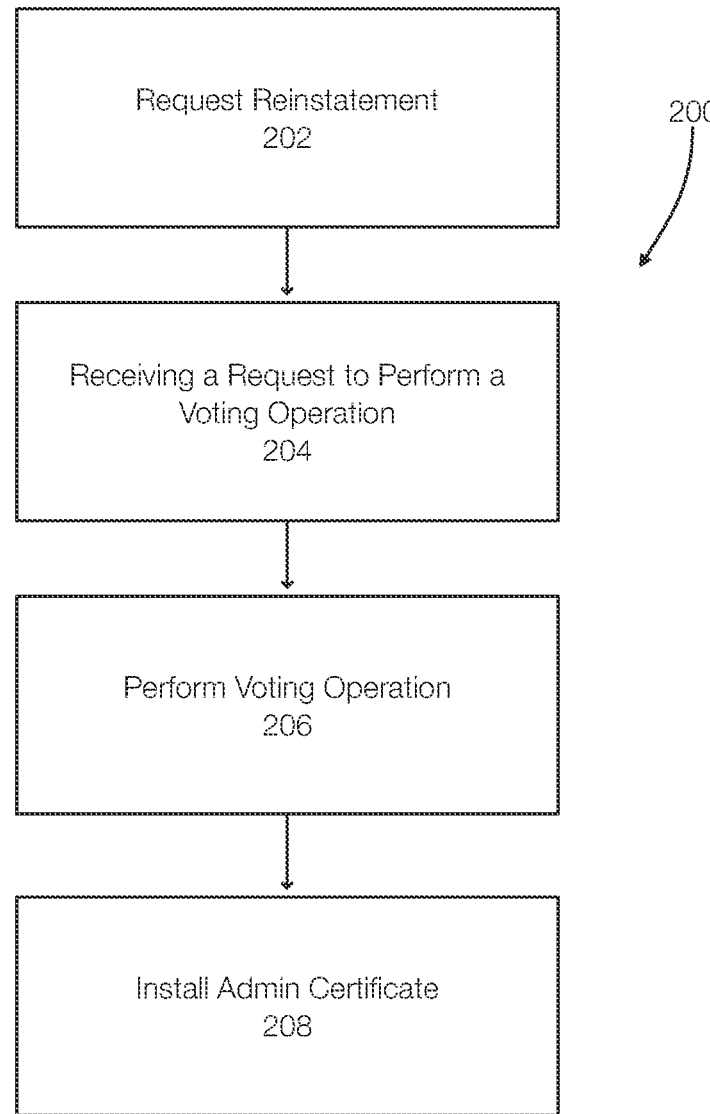
FIG. 2 discloses aspects of reinstating an access services administrator.

FIG. 2 discloses aspects of reinstating an access services admin that has been locked out or prevented from accessing the access services. The method 200 may include performing 202 or receiving a reinstatement request. More specifically, the admin of the access services may discover that their certificate has expired and that they cannot access the access services or perform operations on behalf of or for the benefit of the tenants.

In this example, the admin may contact the tenant admins and send a request for reinstatement, which is received by the tenant admins or their devices. This may be achieved in any manner available to the admin. For example, the admin may send an email to the tenant admins request reinstatement as the admin. The request for reinstatement may be sent by text, by email, by telephone, or the like. This also allows the tenant admins to verify the admin or to verify the identity of the admin requesting reinstatement. Receiving a text or email from the admin may be sufficient for the tenant admins to confirm that the admin cannot access the access services and that the admin requesting reinstatement is the actual admin of the access services. In another example, the request from the admin may include a secret word or other key that is recognized by the tenant admins.

The request for reinstatement from the access services admin may include a new certificate of the admin, which cannot be installed or used by the admin because the admin is currently locked out of the access services. However, the admin can generate the new certificate at any time.

Assuming that a tenant admin agrees with the request for reinstatement received from the admin, the tenant admin may issue or perform a request to perform a voting operation. The request from the tenant admin may be received 204 at the access services or at a voting engine. This request may be performed using a REST API. The request to perform a voting operation may also include characteristics of the admin. For example, the tenant admin may fill out a digital form indicating how the tenant admin verified the identity of the admin requesting reinstatement.

Next, a voting operation is performed 206. In the voting operation, the tenant admins may each be provided with a link (e.g., via email) from the voting engine to a web page that allows them to register their vote. The web page may include the information detailing how the identity of the admin was verified by the tenant admin that initiated the voting operation. The tenant admins may access a specific URL to register their vote. Before reinstating the admin, the voting operation may require a threshold approval level. The threshold level may be any percentage desired by the access services or by the tenants as a whole. The voting operation may be able to complete successfully and authorize or recommend reinstatement as long as a majority of a quorum of the tenant admins vote or if a quorum responds to the voting operation and satisfies a threshold level. In general, any mechanism that allows tenant admins to express their vote on reinstating the admin may be used. Typically, this is performed in a technical manner. Thus, clients may access a web page to automatically cast their digital vote or response to the request for reinstatement.

In the reinstatement of the admin is approved during the voting operation, the admin certificate is installed 208. As previously stated, the request for reinstatement may have included a new certificate. In one example, the tenant admin that initiated or sent the request to perform the voting operation (204) may be granted privileges that can be executed a single time and/or within a determined time period. This gives, in one example, the tenant admin privileges associated with the admin such that the new admin certificate can be installed or added to the access services.

Once the new certificate of the admin is installed 208, access to the access services is restored to the admin and the temporary privileges granted to the tenant admin may be revoked or terminated.

Advantageously, instead of performing an arduous process to reinstate the admin, existing users, such as the tenant admins, can quickly validate the entity claiming to be the admin while maintaining required security measures.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, identity and/or access control operations, reinstatement operations, voting operations, certificate related operations, or the like or combination thereof. More generally, the scope of the invention embraces any operating environment in which the disclosed concepts may be useful.

Example cloud computing environments, which may or may not be public, include storage environments that may provide data protection or data storage functionality for one or more clients. Another example of a cloud computing environment is one in which processing, data protection, and other, services may be performed on behalf of one or more clients or tenants. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines, containers, or virtual machines (VMs), though no particular component implementation is required for any embodiment.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a request to perform a voting operation at a voting engine from a user, wherein the voting operation includes a vote to reinstate access of an admin to a system, performing the voting operation by notifying other users of the quest and providing the users with a voting mechanism, and authorizing to reinstate the admin if votes are above a threshold vote level.

Embodiment 2. The method of embodiment 1, wherein the users include tenant admins and wherein the system comprises access services for tenants.

Embodiment 3. The method of embodiment 1 and/or 2, further comprising evaluating a request for reinstatement received from the admin, wherein the request for reinstatement is received via email, text, telephone, or via an electronic mechanism.

Embodiment 4. The method of embodiment 1, 2, and/or 3, wherein the voting operation is performed in response to the admin losing access to the system.

Embodiment 5. The method of embodiment 1, 2, 3, and/or 4, wherein a certificate of the admin has expired and the admin cannot access the system.

Embodiment 6. The method of embodiment 1, 2, 3, 4, and/or 5, wherein the voting operation is performed over a REST API.

Embodiment 7. The method of embodiment 1, 2, 3, 4, 5, and/or 6, wherein the system uses a zero-trust strategy.

Embodiment 8. The method of embodiment 1, 2, 3, 4, 5, 6, and/or 7, wherein the request to perform the voting operation is performed via a device of the user, wherein the user is a tenant admin, and wherein the tenant admin verifies an identify the admin prior to submitting the request to perform the voting operation.

Embodiment 9. The method of embodiment 1, 2, 3, 4, 5, 6, 7, and/or 8, further comprising installing a new certificate for the admin by the user if the voting operation authorized reinstatement, wherein the user is given permissions and privileges to install the new certificate.

Embodiment 10. A method comprising: evaluating a request for reinstatement from an admin by a tenant admin, wherein a certificate of the admin needed to manage access services has expired, verifying, by the tenant admin, an identify of the admin, receiving a request to perform a voting operation at a voting engine from the tenant admin, wherein the voting operation includes a vote to reinstate access of the admin to the access services, performing the voting operation by notifying other tenant admins of the request for reinstatement and providing the users with a voting mechanism, authorizing to reinstate the admin if votes are above a threshold vote level, and installing a new certificate for the admin, by the tenant admin to reinstate the admin to the access services.

Embodiment 11. The method of embodiment 10, wherein privileges and permissions granted to the tenant admin to install the new certificate in the access services is revoked after the new certificate is installed in the access services.

Embodiment 12. A method for performing any of the operations, methods, or processes, or any portion of any of these, or any combination thereof disclosed herein.

Embodiment 13. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, or agent may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
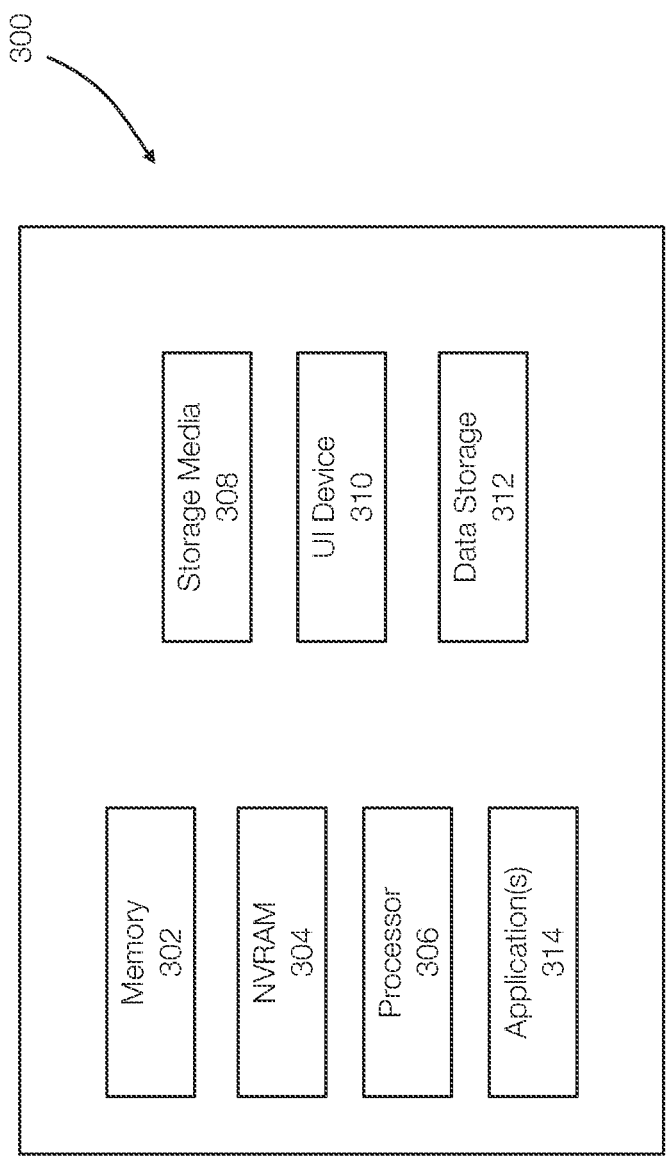
FIG. 3 discloses aspects of a computing device, system, or entity.

With reference briefly now to FIG. 3, any one or more of the entities disclosed, or implied, by the Figures, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3. The device 300 may represent a computing environment, such as the system 100, and may represent a cluster of servers, or the like.

In the example of FIG. 3, the physical computing device 300 includes a memory 302 which may include one, some, or all, of random-access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid-state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

evaluating a request for reinstatement to a system received by a tenant admin from an admin, wherein the admin has lost access to the system, wherein evaluating the request for reinstatement comprises verifying an identify of the admin, wherein the request is received from the admin via a separate communication channel and includes a new certificate of the admin to be installed if the reinstatement is authorized, and wherein receipt of the request by the tenant admin is sufficient for the tenant admin to verify the identity of the admin to the tenant admin;

in response to evaluating the request for reinstatement, receiving a request to perform a voting operation at a voting engine from the tenant admin, wherein the voting operation includes a vote to reinstate access of the admin to a system and is performed in response to the admin response to the admin losing the access to the system, wherein the voting operation is initiated only after confirming that no administrator has valid certificate-based or basic authentication access to the system, and wherein the request to perform the voting operation includes information documenting how the tenant admin verified the identity of the admin;

performing the voting operation by notifying other tenant admins of the request and providing the tenant admins with a voting mechanism;

authorizing to reinstate the admin if votes are above a threshold vote level; and installing the new certificate of the admin by the tenant admin to reinstate the admin, wherein the tenant admin is granted temporary permissions and privileges solely to install the new certificate, and wherein the temporary privileges are executable a single time and revoked automatically after the certificate installation reinstating the admin.

2. The method of claim 1, wherein the system comprises access services for tenants.

3. The method of claim 1, wherein the request for reinstatement is received via email, text, telephone, or via an electronic mechanism.

4. The method of claim 1, wherein a certificate of the admin has expired and the admin cannot access the system.

5. The method of claim 1, wherein the voting operation is performed over a REST API.

6. The method of claim 1, wherein the system uses a zero-trust strategy.

7. The method of claim 1, wherein the request to perform the voting operation is performed via a device of the tenant admin.

8. A non-transitory storage medium having stored therein instructions that are executable by one or more hardware processors to perform operations comprising:

evaluating a request for reinstatement to a system received by a tenant admin from an admin, wherein the admin has lost access to the system, wherein evaluating the request for reinstatement comprises verifying an identify of the admin, wherein the request is received from the admin via a separate communication channel and includes a new certificate of the admin to be installed if reinstatement is authorized, and wherein receipt of the request by the tenant admin user is sufficient for the tenant admin to verify the identity of the admin to the tenant admin;

in response to evaluating the request for reinstatement, receiving a request to perform a voting operation at a voting engine from the tenant admin, wherein the voting operation includes a vote to reinstate access of the admin to a system and is performed in response to the admin response to the admin losing the access to the system, wherein the voting operation is initiated only after confirming that no administrator has valid certificate-based or basic authentication access to the system, and wherein the request to perform the voting operation includes information documenting how the tenant admin verified the identity of the admin;

performing the voting operation by notifying other tenant admins of the request and providing the tenant admins with a voting mechanism; authorizing to reinstate the admin if votes are above a threshold vote level; and installing the new certificate of the admin by the tenant admin to reinstate the admin, wherein the tenant admin is granted temporary permissions and privileges solely to install the new certificate, and wherein the temporary privileges are executable a single time and revoked automatically after the certificate installation reinstating the admin.

9. The non-transitory storage medium of claim 8, wherein the system comprises access services for tenants.

10. The non-transitory storage medium of claim 8, wherein the request for reinstatement is received via email, text, telephone, or via an electronic mechanism.

11. The non-transitory storage medium of claim 8, wherein a certificate of the admin has expired and the admin cannot access the system.

12. The non-transitory storage medium of claim 8, wherein the voting operation is performed over a REST API.

13. The non-transitory storage medium of claim 8, wherein the system uses a zero-trust strategy.

14. The non-transitory storage medium of claim 8, wherein the request to perform the voting operation is performed via a device of the tenant admin.

15. A method comprising: evaluating a request for reinstatement from an admin by a tenant admin, wherein a certificate of the admin needed to manage access services has expired, wherein the request is received by the tenant admin via a separate communication channel from the access services and includes a new certificate of the admin to be installed if reinstatement is authorized, wherein receipt of the request by the tenant admin is sufficient for the tenant admin to verify the identity of the admin;

verifying, by the tenant admin, an identity of the admin;

receiving a request to perform a voting operation at a voting engine from the tenant admin, wherein the voting operation includes a vote to reinstate access of the admin to the access services, wherein the voting operation is initiated only after confirming that no administrator has valid certificate-based or basic authentication access to the access services, and wherein the request to perform the voting operation includes information documenting how the tenant admin verified the identity of the admin;

performing the voting operation by notifying other tenant admins of the request for reinstatement and providing the tenant admin and the other tenant admins with a voting mechanism;

authorizing to reinstate the admin if votes are above a threshold vote level; and installing a new certificate for the admin, by the tenant admin to reinstate the admin to the access services, wherein the tenant admin is granted temporary permissions and privileges solely to install the new certificate, and wherein the temporary privileges are executable a single time and revoked automatically after the certificate installation.

16. The method of claim 15, wherein privileges and permissions granted to the tenant admin to install the new certificate in the access services is revoked after the new certificate is installed in the access services.

\* \* \* \* \*